US 6,630,762 B2

(12) United States Patent
Naito et al.

(10) Patent No.: US 6,630,762 B2
(45) Date of Patent: Oct. 7, 2003

(54) PERMANENT MAGNET ROTOR AND METHOD OF MAKING THE SAME

(75) Inventors: Shinya Naito, Shizuoka (JP); Haruyoshi Hino, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 09/882,370

(22) Filed: Jun. 15, 2001

(65) Prior Publication Data

US 2002/0070620 A1 Jun. 13, 2002

(30) Foreign Application Priority Data

Jun. 16, 2000 (JP) .......................................... 2000-181239

(51) Int. Cl.⁷ ............................................... H02K 21/12
(52) U.S. Cl. ............................... 310/156.53; 310/156.56
(58) Field of Search ................................. 310/216, 261, 310/156.48, 156.49, 156.53, 156.55, 156.56, 156.12, 156.13

(56) References Cited

U.S. PATENT DOCUMENTS

| | | | | |
|---|---|---|---|---|
| 4,924,130 A | * | 5/1990 | Fratta | 310/261 |
| 5,500,994 A | * | 3/1996 | Itaya | 29/598 |
| 5,945,758 A | * | 8/1999 | Goltz et al. | 310/156 |
| 5,945,760 A | | 8/1999 | Honda et al. | 310/156 |
| 6,084,496 A | | 7/2000 | Asano et al. | 310/156 |
| 6,225,724 B1 | * | 5/2001 | Toide et al. | 310/216 |
| 6,353,275 B1 | * | 3/2002 | Nishiyama et al. | 310/156.53 |
| 2002/0041127 A1 | | 4/2002 | Naito et al. | 310/156 |
| 2002/0047409 A1 | | 4/2002 | Hiroyuki et al. | 310/156 |

FOREIGN PATENT DOCUMENTS

| | | | | |
|---|---|---|---|---|
| EP | 1164683 A2 | * | 12/2001 | ............ 310/156.53 |
| JP | 63-129834 | * | 6/1988 | ............ 310/156.56 |
| JP | 08336269 A2 | | 12/1996 | |
| JP | 09266646 A2 | | 10/1997 | |
| JP | 11-206075 | | 1/1998 | |
| JP | 11-262205 | | 3/1998 | |
| JP | 10271722 A2 | | 10/1998 | |
| JP | 11206075 A2 | | 7/1999 | |
| JP | 11262205 A2 | | 9/1999 | |

OTHER PUBLICATIONS

Hiroshi Murakami, et al., *Highly Efficient Double Layer IPM (Interior Permanent Magnet) Motor*, Matsushita Technical Journal, vol. 44, No. 2, Apr. 1998, pp. 37–42. (Reference in Japanese with English abstract and drawing captions).

Fumitoshi Yamashita, et al., *Magnetic Stability of Exchange Spring Magnets and Application to Direct Molding Magnet Rotor*, Matsushita Technical Journal, vol. 44, No. 2, Apr. 1998, pp. 78–86. (Reference in Japanese with English abstract and drawing captions).

* cited by examiner

*Primary Examiner*—Tran Nguyen
(74) *Attorney, Agent, or Firm*—Knobbe, Martens, Olsen & Bear, LLP

(57) ABSTRACT

To effectively utilize the reluctance torque in an embedded magnet type permanent magnet rotor to thereby decrease the leakage flux, a rotor core is formed with slits having longitudinal ends. The longitudinal ends of the slits are open to the outside in the outside circumferential surface of the rotor core. Narrow bridges are formed at longitudinal middle portions of the slits. The narrow bridges connect the radially outer portions and the radially inner portions of the rotor core. Permanent magnets are embedded in the slits. The embedded permanent magnets are magnetized in the direction of thickness of the slits.

8 Claims, 8 Drawing Sheets

US 6,630,762 B2

PERMANENT MAGNET ROTOR AND METHOD OF MAKING THE SAME

RELATED APPLICATIONS

The present application claims the benefit of priority under 35 U.S.C. §119(a) from Japanese Patent Application No. 2000-181239, filed on Jun. 16, 2000, which is incorporated by reference herein.

BACKGROUND OF THE INVENTION

1. Field of the Invention

The present invention relates to a permanent magnet rotor used in a rotary electric device (including a device that has a rotating rotor and a device that has a rotating coil), such as, for example, a permanent magnet electric motor and a permanent magnet generator. This invention also relates to a method of making such a rotor. This invention particularly relates to a permanent magnet rotor having an embedded magnet. The rotor provides effective utilization of the reluctance torque and reduces the leakage flux caused by the magnetic flux of the permanent magnets passing through bridges in the rotor to form a loop instead of flowing into the stator.

2. Description of the Related Art

A conventional embedded magnet type permanent magnet rotor is disclosed, for example, in Laid Open Japanese Patent Application Hei 11-262205 or in Laid Open Japanese Patent Application Hei 11-206075. The shape of one pole (in end view) of a permanent magnet rotor core 1 of an exemplary rotor 10 is illustrated in FIG. 7. As illustrated, the rotor core 1 is formed with a plurality of slits 2A, 2B, 2C in multiple layers. Each of the slits 2A, 2B, 2C has an end face in the shape of an arc. Each arc is configured such that the longitudinal ends of the arc are located in the vicinity of the outside circumferential surface of the rotor core 1 and such that the longitudinal middle portion of the arc is located radially inwardly of the end portions. Each slit extends to the opposite end of the rotor core 1 in the axial direction (perpendicular to the plane of FIG. 7) with the same cross-sectional shape as the shape of the end face shown in FIG. 7.

In order to form a permanent magnet rotor 10 with a rotor core 1 having embedded permanent magnets, the slits 2A, 2B, 2C are filled with a bond magnetic material (e.g., a plastic magnetic material) by injection molding, or the like. After filling the slits, the bond material is solidified. Alternatively, a respective permanent magnet may be machined in the shapes of each of the slits 2A, 2B, 2C, and the machined magnets are then fitted into the corresponding slits 2A, 2B, 2C.

Furthermore, with respect to the permanent magnet rotor 10 shown in FIG. 7, bridges 3 of a certain thickness are formed between the longitudinal ends of the slits 2A, 2B, 2C and the outside circumferential surface of the core 1 so that the radially outer portions (i.e., the portions on the outside circumferential surface side) and the radially inner portions (i.e., the portions on the center axis side) of the rotor core 1 with respect to the respective slits 2A, 2B, 2C will not be completely separated by the slits 2A, 2B, 2C.

However, it has been shown that in the foregoing conventional permanent magnet rotor 10 of FIG. 7, the bridges 3 formed in the rotor core 1 at the outside circumferential surface side ends of the slits 2A, 2B, 2C allow leakage flux to flow through the bridges 3, which prevents effective use of the permanent magnets. For example, FIG. 8 shows the magnetic flux generated in the permanent magnet rotor 10 and the stator pole teeth 20, in dashed lines, and illustrates the leakage flux SF flowing through the bridges 3.

In addition, the leakage flux SF in the bridges 3 causes portions of the magnetic flux density to be greater in the area of the bridges than in the surrounding areas, as illustrated in FIG. 8 by a symbol A. This causes a magnetic resistance in the magnetic paths of the q-axis magnetic flux $\Phi q$ to increase, which is a factor of lowered reluctance torque.

Torque generated by the motor is written as:

$$T = (Pn \times \Psi a \times iq) + (Pn \times (Ld - Lq) \times id \times iq) \qquad (1),$$

where:

Ld is the d-axis inductance of the coil,

Lq is the q-axis inductance of the coil, id is the d-axis component of the armature current, iq is the q-axis component of the armature current, $\Psi a$ is the interlinking flux of the armature coil due to permanent magnets, and Pn is the number of the pairs of poles.

The direction of the d-axis is a direction of a line connecting the center of the magnet poles and the center of the rotor. The direction of the q-axis is a direction of a line passing between the poles and through the center of the rotor. That is, the direction of the q-axis is a direction at 90 degrees in electrical angle with respect to direction of the d-axis.

The first term of the expression (1) represents a torque due to the permanent magnets, and the second term a reluctance torque.

FIGS. 9 and 10 illustrate the conventional permanent rotor 10 in end view, depicting the directions of the q-axis and the d-axis. The dashed lines in FIG. 9 illustrate the directions of the q-axis magnetic flux $\Phi q (= Lq \times iq)$ generated by iq. The dashed lines in FIG. 10 illustrate the d-axis magnetic flux $\Phi q (= Ld \times id)$ generated by id.

In the embedded magnet type permanent magnet rotor, permanent magnets magnetically equivalent to air gaps are disposed in the magnetic paths of the d-axis magnetic flux $\Phi d$, so that the d-axis inductance Ld is small. On the contrary, the magnetic paths of the q-axis magnetic flux $\Phi q$ pass through the rotor core 1, so that the q-axis inductance Lq is large (that is, the magnetic resistance is small). Therefore, Ld<Lq, and appropriate currents id, iq will generate the reluctance torque $(Ld - Lq) \times id \times iq$.

Portions with high magnetic flux density in the bridges 3 narrow the magnetic paths of $\Phi q$ and increase the magnetic resistance of the q-axis magnetic paths, which constitutes a factor of lowering the reluctance torque.

SUMMARY OF THE INVENTION

In view of the foregoing unsolved problem with the conventional permanent magnet rotor, embodiments of the present invention are directed to a permanent magnet rotor capable of providing an effective utilization of embedded magnets and the reluctance torque and to a preferred method of making the such a rotor.

One aspect of the present invention is a permanent magnet rotor with a rotor core that has permanent magnets embedded therein in slits. The longitudinal ends of the slits in which the permanent magnets are embedded are open to the outside in the circumferential surface of said rotor core. Bridges that connect the radially outer portions and the radially inner portions of the rotor core with respect to the respective slits are provided at positions inwardly of the longitudinal ends of the slits toward the longitudinal middle portions.

In preferred embodiments of this aspect of the invention, the bridges are formed, not at the longitudinal ends of the slits, but at positions inwardly of the longitudinal ends toward the middle portions of the slits. Therefore, the leakage flux is produced from either end of the bridges, so that the region of high magnetic density narrowing the magnetic paths between slits, is decreased with the help of the leakage flux. As a result, increased magnetic resistance in the magnetic paths of the q-axis magnetic flux Φq is prevented and the reluctance torque can be utilized effectively.

In preferred embodiments in accordance with this aspect of the present invention, the permanent magnets in the permanent magnet rotor are formed such that the slots are filled with bond magnet (i.e., plastic magnetic material) and the bond magnet is then solidified.

Preferably, the bond magnet is used to form the permanent magnets by injection molding, so that the permanent magnets can be embedded in the rotor core even when the shape of the slits is rather complicated. The injection molding using bond magnet may be an ordinary one in which the bond magnet is filled in the slits and solidified. On the other hand, if the bond magnet is anisotropic, the injection molding process may be an in-magnetic field injection molding process in which the bond magnet is filled in the slits and solidified in a magnetic field.

Preferably, the inside surfaces of the slits have projections or recesses formed therein, and the recesses and projections are adapted to be connected to the bond magnet when it is solidified.

Still more preferably, the projections or recesses on the inside surfaces of the slits strengthen the connection of the solidified bond magnets to the inside surfaces of the slits. Therefore, the connection between the radially outer portions and the radially inner portions of the rotor core with respect to the respective slits is strengthened through the solidified bond magnets, thereby providing a sturdier rotor core.

Also preferably, the bridges are inclined with respect to the direction of magnetization of the permanent magnets.

Still more preferably, the bridges are inclined with respect to the direction of magnetization of the permanent magnets so that the magnetic resistance in the bridges is increased without reducing the strength of the bridges. This decreases the leakage flux and improves the effectiveness of the magnets.

Another aspect of the present invention is a permanent magnet rotor with a rotor core that has permanent magnets embedded therein. The permanent magnets are formed such that bond magnet (e.g., plastic magnetic material) is filled in the slits and solidified. The inside surfaces of the slits have projections or recesses formed thereon, and the projections and recesses are adapted to be connected to the bond magnet when it is solidified.

In preferred embodiments in accordance with this aspect of the invention, the connection between the radially outer portions and the radially inner portions of the rotor core with respect to the respective slits is strengthened through the bond magnet, thereby providing a sturdier rotor core.

Another aspect of the present invention is a permanent magnet rotor with a rotor core having permanent magnets embedded in slits therein. Bridges connect the radially outer portions and the radially inner portions of the rotor core with respect to the respective slits in which the permanent magnets are embedded. The bridges are inclined with respect to the direction of magnetization of the permanent magnets.

In accordance with this aspect of the invention, the magnetic resistance in the bridges is increased without reducing the strength of the bridges. This decreases the leakage flux and improves the effectiveness of the magnets.

Another aspect of the present invention is a method of making a permanent magnet rotor with a rotor core having permanent magnets embedded therein in slits. The longitudinal ends of the slits in which the permanent magnets are embedded are open to the outside in the circumferential surface of the rotor core. Processes are provided in which treatment of the rotor core is performed with the rotor core set at a fixed angular position using the openings of the slits.

Preferably, the treatment of the rotor core is performed with the rotor core set at a fixed angular position using the openings of the slits in the circumferential surface of the rotor core. Thus, an additional device for setting the angular position of the rotor core is not needed. The treatment under the condition of the fixed angular position of the rotor core, includes, for example, filling of bond magnet into the slits, magnetization of the filled bond magnet, and the like.

BRIEF DESCRIPTION OF THE DRAWINGS

The preferred embodiment of the present invention will be described in detail below in connection with the accompanying drawing figures, in which.

DETAILED DESCRIPTION OF THE PREFERRED EMBODIMENT

Embodiments of the present invention will be described in detail below with reference to the drawings.

Figure 1:
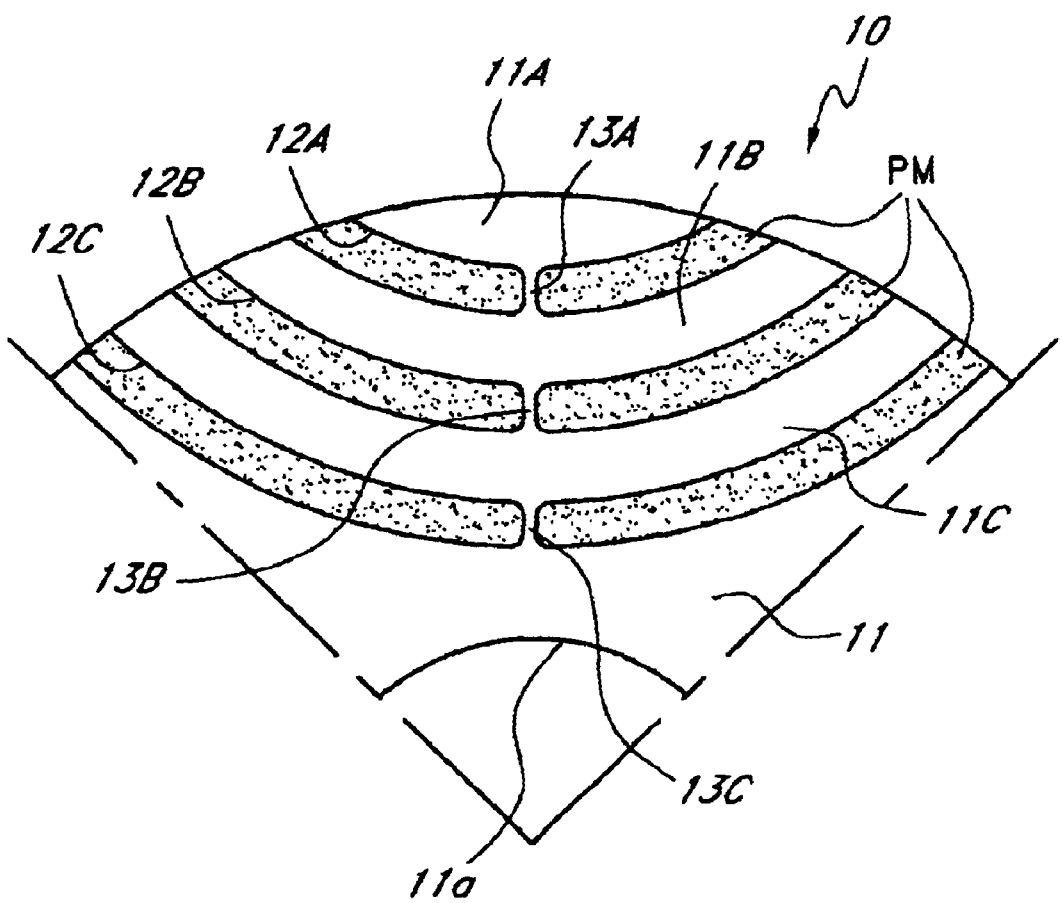
FIG. 1 is a view showing the configuration of a first embodiment of this invention.

FIG. 1 is a view of a first embodiment of this invention, showing an end view of the shape of a pole of a permanent magnet rotor 10 used for an inner rotor type permanent magnet motor or the like.

The permanent magnet rotor 10 has a rotor core 11 in the shape of a laminated column comprising numerous thin round blanked-out plates. A shaft hole 11a is formed at the center of the rotor core 11 is formed. The shaft hole 11a is adapted to receive a rotary shaft (not shown), which is inserted coaxially into the shaft hole 11a.

The rotor core 11 is also formed with slits 12A, 12B, 12C. Each slit has an arcuate shape with the convex side of the arc directed toward the shaft hole 11a, as shown in FIG. 1. The slits penetrate the rotor core 11 between both end faces thereof. The slits 12A, 12B, 12C are arranged in layers concentrically such that the slit 12A on the radially outer side of the rotor core 11 is in the shape of an arc with a small diameter, the slit 12C on the radially inner side is in the shape of an arc with a large diameter, and the intermediate slit 12B is in the shape of an arc with a medium diameter.

Unlike the slits in the conventional rotor core discussed above, both longitudinal ends of each of the slits 12A, 12B, 12C (in end view) are open to the outside in the outside circumferential surface of the rotor core 11. Therefore, the radially outer portions and the radially inner portions of the rotor core 11 with respect to the respective slots 12A, 12B, 12C are separated from each other. In this embodiment, narrow bridges 13A, 13B, 13C are left at the longitudinal middle portions (in end view) of the slits 12A, 12B, 12C, respectively, when the plates for the rotor core 11 are prepared by blanking. The narrow bridges 13A, 13B, 13C connect the radially outer portions and the radially inner portions of the rotor core 11. The bridges 13A, 13B, 13C extend axially at the respective same radial distance from the center of the rotor core 11 as the respective slits 12A, 12B, 12C, so that the bridges 13A, 13B, 13C serve as a means for preventing separation of the radially outer portions and the radially inner portions of the rotor core 11 with respect to the respective slits 12A, 12B, 12C. That is, the radially outer portion 11A of the rotor core 11 with respect to the slit 12A is connected to the radially inner portion thereof through the bridge 13A. The radially outer portion 11B of the rotor core 11 with respect to the slit 12B is connected to the radially inner portion thereof through the bridge 13B. The radially outer portion 11C of the rotor core 11 with respect to the slit 12C is connected to the radially inner portion thereof through the bridge 13C.

Permanent magnets PM are embedded in the slits 12A, 12B, 12C. The permanent magnets PM are magnetized in the direction of the widths of the slits 12A, 12B, 12C in end view. The permanent magnets PM may be formed by filling the slits 12A, 12B, 12C with bond magnet material, which is then solidified, and then magnetized. For a small and powerful permanent magnet PM, an anisotropic bond magnet may be used to form the permanent magnets PM by in-magnetic field injection molding.

Figure 2:
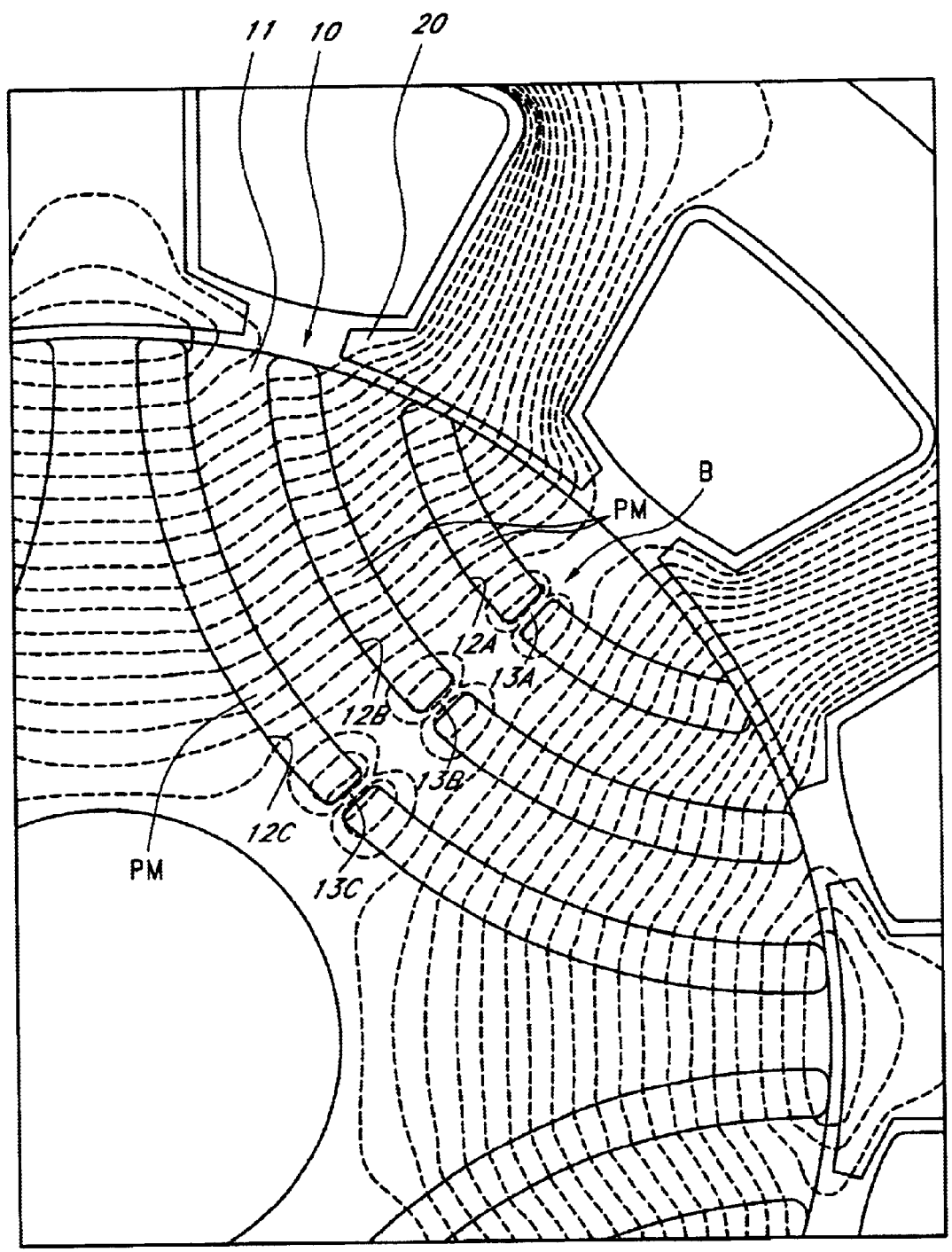
FIG. 2 is a view showing the distribution of the magnetic flux, illustrating the effect of the first embodiment.
Figure 8:
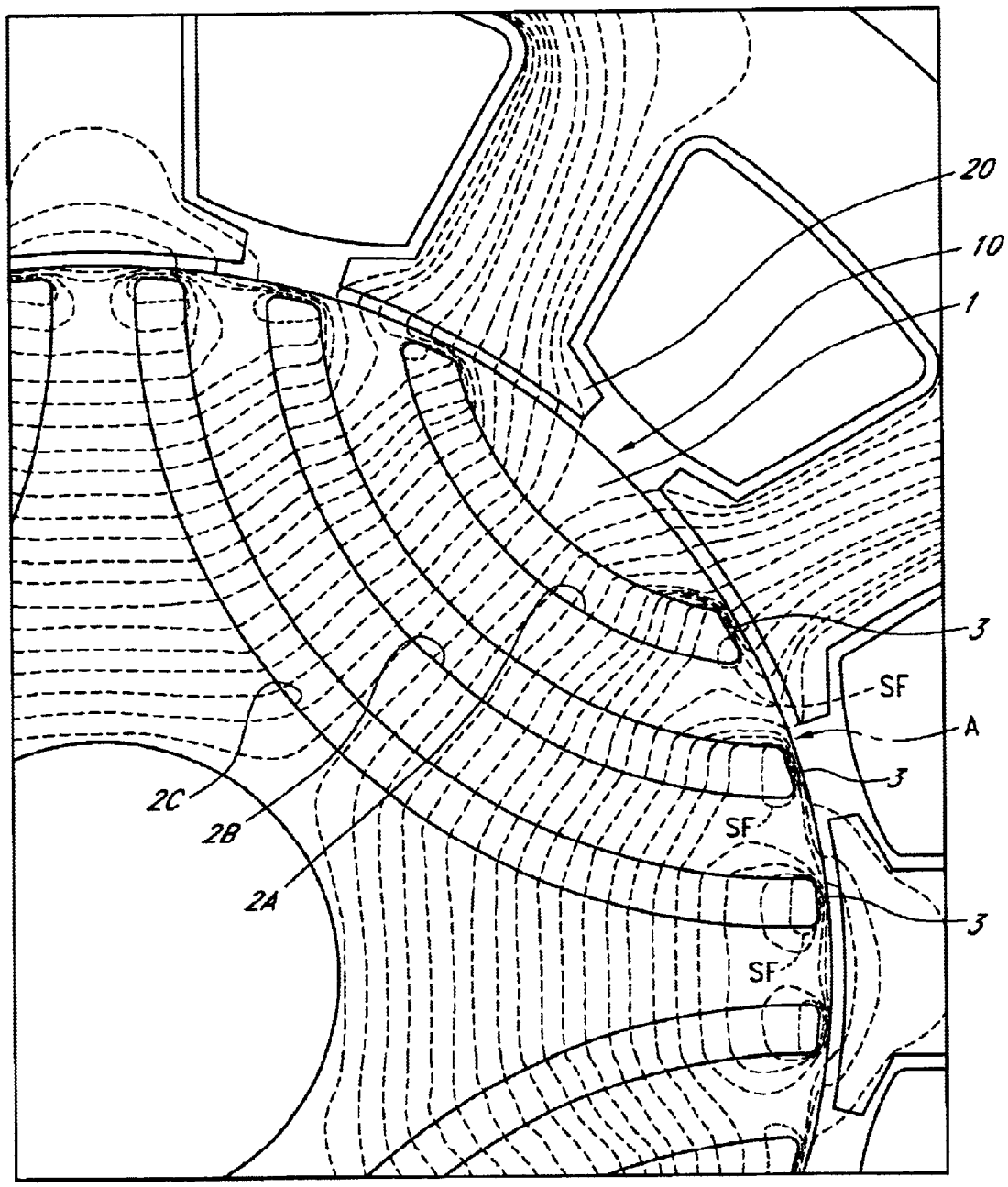
FIG. 8 is a view showing the distribution of the magnetic flux in the conventional permanent magnet rotor.
Figure 9:
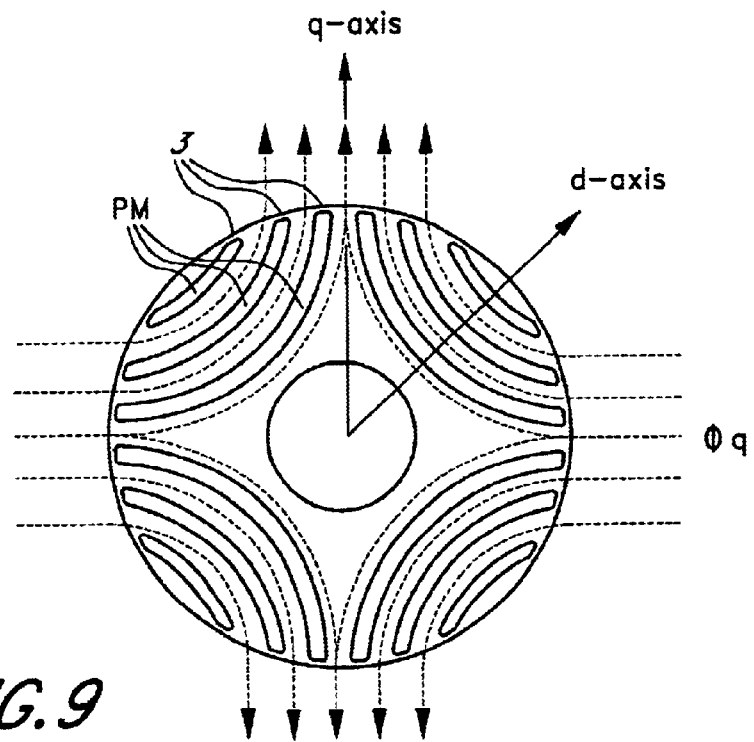
FIG. 9 is an illustration of the q-axis magnetic flux.
Figure 10:
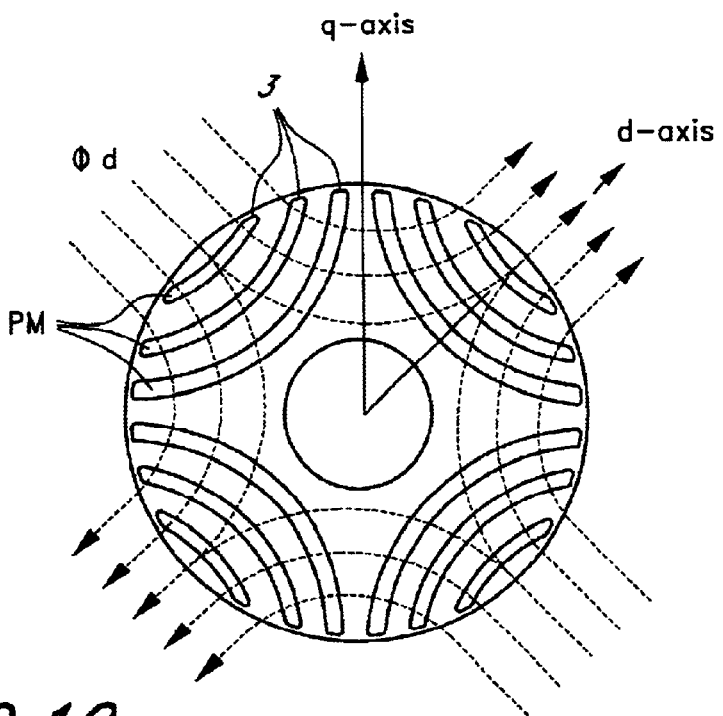
FIG. 10 is an illustration of the d-axis magnetic flux.

FIG. 2 is a view that illustrates the magnetic flux generated in the permanent magnet rotor 10 and the stator core plate teeth 20 when assembled in an electric motor. The magnetic flux is represented by dashes lines, corresponding to the dashed lines in FIG. 8, which was discussed above.

In the permanent magnet rotor 10 of the embodiment of FIG. 1 and FIG. 2, the longitudinal ends of the slits 12A, 12B, 12C are open to the outside in the outside circumferential surface of the rotor core 11. The bridges 13A, 13B, 13C are provided at the longitudinal middle portions of the respective slits 12A, 12B, 12C, so that the leakage flux is generated from magnetic paths in either side of the bridge, as shown in FIG. 2 by a symbol B, thereby reducing the region of high magnetic flux density narrowing the magnetic paths of the magnetic flux $\Phi q$ between slits, caused by the leakage flux SF. As a result, increased magnetic resistance in the magnetic paths of the q-axis magnetic flux $\Phi q$ of the rotor core 11 is prevented and the reluctance torque can be utilized effectively. Such an advantage is useful particularly when the number of slits is large (that is, multilayer). In addition, the region of high magnetic flux density is not formed in the vicinity of the outside circumferential surface of the permanent magnet rotor 10, so that the flow toward the stator 10 due to the permanent magnets is not disturbed. Furthermore, the change in the distribution of the magnetic flux in the vicinity of the outside circumferential surface of the permanent magnet rotor 10 is largely due to the effect of the relative positioning of the stator and the rotor, so that the iron loss can be decreased if high magnetic flux density spots are eliminated from this region.

Figure 7:
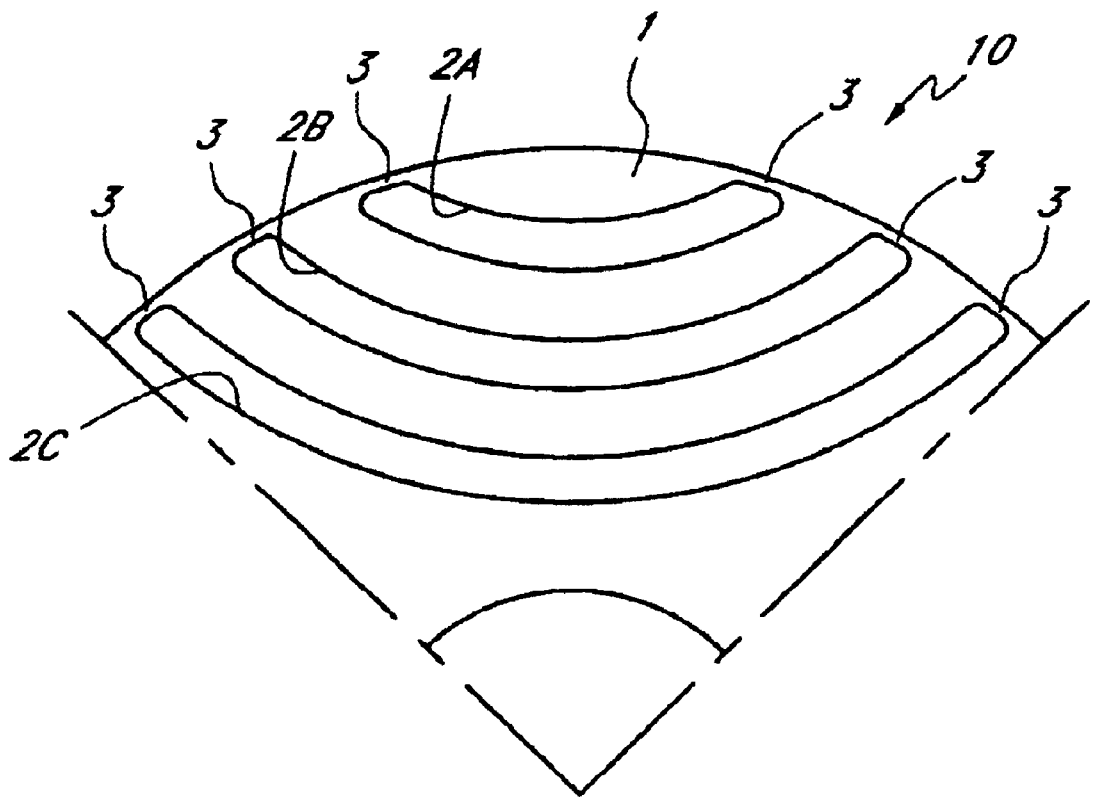
FIG. 7 is a view showing the configuration of a conventional permanent magnet rotor.

Furthermore, in this embodiment, the slits 12A, 12B, 12C are formed with the bridges 13A, 13B, 13C as described above. Thus, the leakage flux passing through the bridges can be decreased compared with a conventional permanent magnet rotor 10 in which the bridges 3 are provided at both longitudinal ends of the slits as shown in FIG. 7, thereby providing a more effective utilization of the permanent magnets.

In the illustrated embodiment, the slits 12A, 12B, 12C are formed with the bridges 13A, 13B, 13C so that one bridge is provided for each slit. In an alternative embodiment (not shown), a plurality of bridges may be provided in each slot, in which case the bridge width is determined such that the sum of the widths of the bridges is equivalent of the width of the single bridge. The plurality of bridges allow the leakage flux to be dispersed, thereby effecting a further reduction in the incremental longitudinal magnetic resistance of the rotor core 11.

In the illustrated embodiment, the bridges 13A, 13B, 13C are provided at the longitudinal middle portions of the slits 12A, 12B, 12C, so that the left and right side masses of the radially outer portions 11A, 11B, 11C are balanced with respect to the respective bridges 13A, 13B, 13C as centers. Therefore, if the centrifugal force generated during rotation of the permanent magnet rotor 10 is exerted on the radially outer portions 11A–11C, no moment large enough to bend the bridges 13A–13C is produced. If a moment is produced, the moment is very small. Thus, the arrangement of the illustrated embodiment in which one bridge 13A, 13B, 13C is provided in each of the slits 12A, 12B, 12C does not significantly increase the possibility of damaging the rotor core 11.

Figure 3:
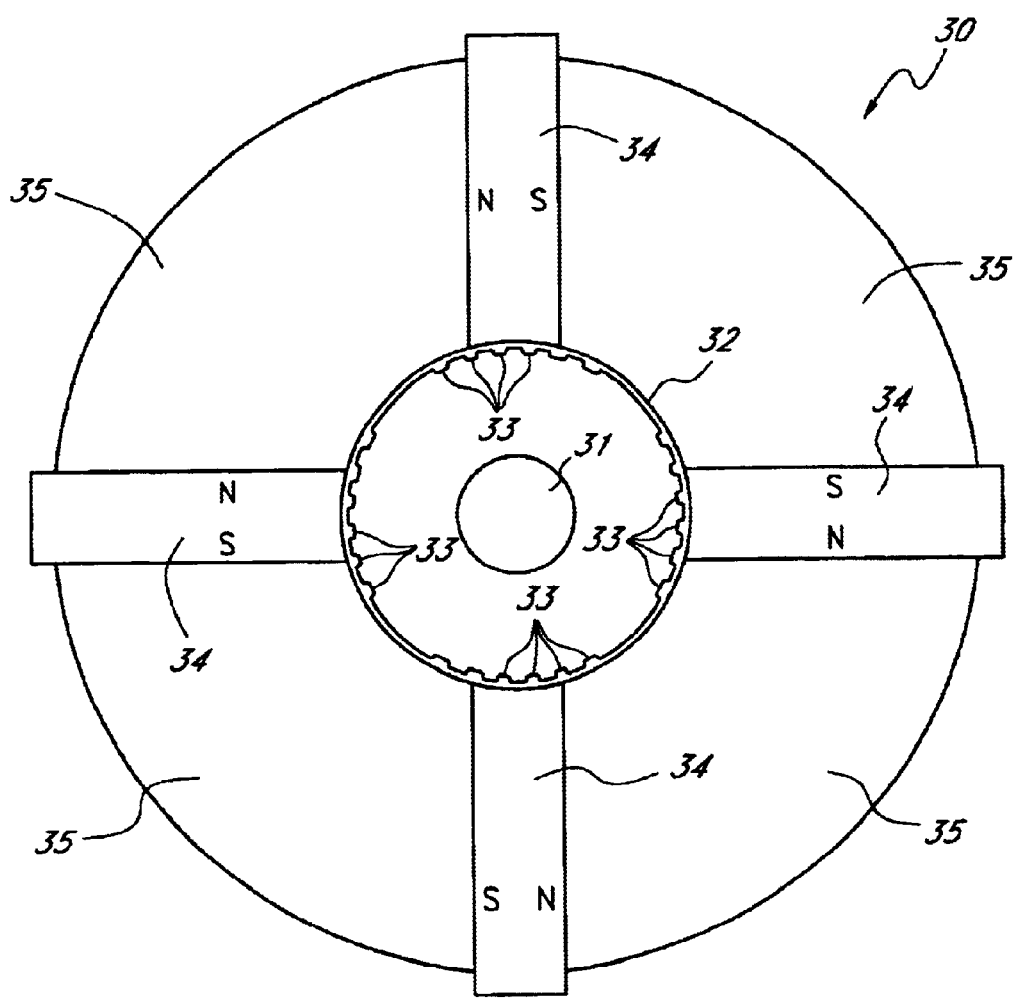
FIG. 3 is a view of an example of an injection molding die for a permanent magnet rotor.

FIG. 3 is a plan view of a portion of an injection molding die 30 for use in a process for manufacturing the permanent magnet rotor 10 as shown in the illustrated embodiment. The injection molding die 30 is a cylindrical die for use in a process for forming the anisotropic bond magnet within the slits 12A, 12B, 12C of the rotor core 11 by in-magnetic field injection molding. At the center, the die has a support shaft 31 adapted to be inserted into the shaft hole 11a of the rotor core 11. A sleeve 32 surrounds the support shaft 31 coaxially. The outside circumferential surface of the sleeve 32 is surrounded by permanent magnets 34 and yokes 35 for forming the orientating magnetic field, which are alternately disposed circumferentially at regular intervals. The sleeve 32 has, on the inside circumferential surface, a plurality of projections 33 adapted to be fitted slightly in the longitudinal ends of the slits 12A, 12B, 12C of the rotor core 11. The projections 33 are actually long ridges running axially (in the direction perpendicular to the plane of FIG. 3) that are conformed to the shape of the slits 12A, 12B, 12C. The locations of the projections 32 are determined as appropriate, depending on the positional relation between the longitudinal ends of the slits 12A, 12B, 12C, and the arrangement of the permanent magnets 32 for orientation.

When the bond magnet is poured into the rotor core 11 using the injection molding die 30, the support shaft 31 of the molding die 31 is inserted into the shaft hole 11a of the rotor core 11. The longitudinal ends of the slits 12A, 12B, 12C are aligned with the projections 33 to allow the whole rotor core 11 to be pushed into the injection molding die 30. The angular position of the rotor core 11 in the injection molding die 30 is thus set when the longitudinal ends of the slits 12A, 12B, 12C are aligned with the projections 33.

The rotor core tends to be rotated by the reluctance torque due to the orientating magnetic field while being inserted into the injection molding die 30; however, the projections 33 are fitted slightly in the longitudinal ends of the slits 12A, 12B, 12C, which prevents the rotor core 11 from being rotated by the reluctance torque in the injection molding die 30.

Further, if the projections 33 are fitted slightly in the longitudinal ends of the slits 12A, 12B, 12C, the arrangement of this invention in which one bridge 13A, 13B, 13C is provided in each slit 12A, 12B, 12C will prevent the bridges 13A, 13B, 13C from being bent by injection pressure during injection molding with displacement of the radially outer portions 11A, 11B, 11C.

Figure 4:
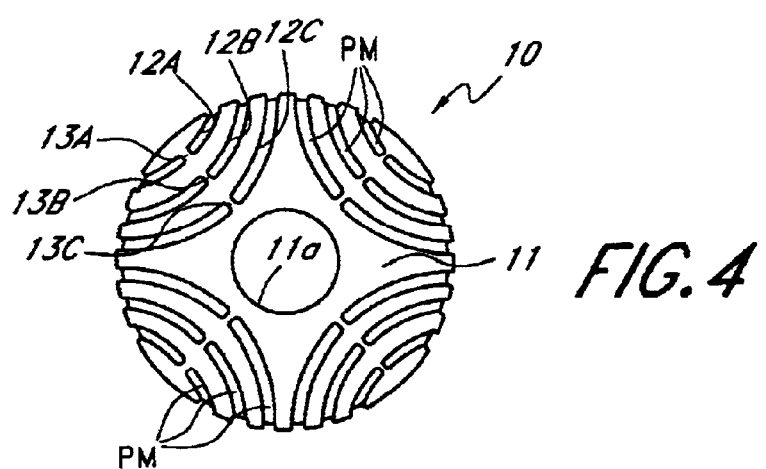
FIG. 4 is a front view of a permanent magnet rotor manufactured using the injection molding die of FIG. 3.

As illustrated in FIG. 4, the projections 33 provided on the inside circumferential surface of the sleeve 32 of the injection molding die 30 cause the permanent magnet rotor 10 manufactured using this injection molding die of FIG. 3 to have regions formed at the longitudinal ends of the slits 12A, 12B, 12C in which the permanent magnets are cut off by the amount corresponding to the height of the projections. In the preferred embodiments, the height of the projections 33 is very small so that the cut off ends of the slits 12A, 12B, 12C does not cause a problem with respect to the performance of the permanent magnets rotor 10.

FIGS. 5(a), 5(b), 5(c) and 5(d) are views that illustrate a second embodiment of the present invention. In FIGS. 5(a), 5(b), 5(c) and 5(d), like parts and regions described above in connection with the first embodiment are designated by like symbols, and will not be described again in connection with FIGS. 5(a), 5(b), 5(c) and 5(d).

Figure 5A:
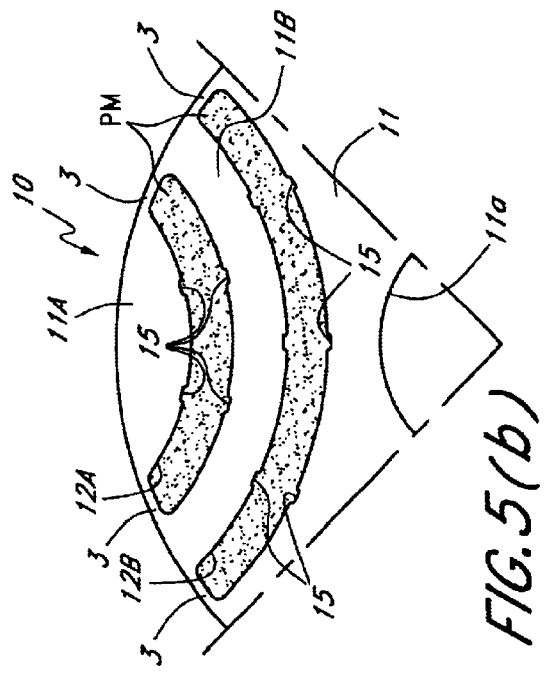
FIGS. 5(a), 5(b), 5(c) and 5(d) are views showing configurations of a second embodiment of this invention.

In the embodiment shown in FIG. 5(a), bridges 3 are formed at the longitudinal ends of the slits 12A, 12B and no bridges are formed in the middle portions thereof. Thus, with regard to the location of the bridges 3, the arrangement of the embodiment of FIG. 5(a) is the same as that of the permanent magnet rotor 10 shown in FIG. 7. Also, in the embodiment of FIG. 5(a), a plurality of projections 14 are provided on the inside surfaces of the slits 12A, 12B. The projections 14 are long ridges running axially of the rotor core 11 (in the direction perpendicular to the plane of FIG. 5(c). The projections 14 are disposed on the inside surfaces of the slits 12A, 12B at appropriate intervals. In addition, each projection 14 has an inverted trapezoidal cross-section whose width increases gradually toward the top. As a result, when the bond magnet is injection molded, the projections 14 engage the permanent magnets so that the inside surfaces of the slits 12A, 12B and the permanent magnets PM embedded therein are connected firmly.

Because of the engagement of the projections 14 and the bond magnet, the radially outer portions 11A and the radially inner portions of the rotor core 11 with respect to the slit 12A are connected firmly not only by the bridges 3 but also through the permanent magnet PM in the slits 12A. Similarly, the radially outer portions 11B and the radially inner portions of the rotor core 11 with respect to the slit 12B are connected firmly not only by the bridges 3 but also through the permanent magnet PM in the slits 12B. Thus, the rotor core 11 is sturdier and will withstand the large radial force due to the centrifugal force during high speed rotation. In other words, the sturdy construction of the rotor core due to provision of the projections 14 allows the bridges 3 to be correspondingly thinner, which decreases the leakage flux, and increases the effective utilization of the permanent magnets PM.

Figure 5B:
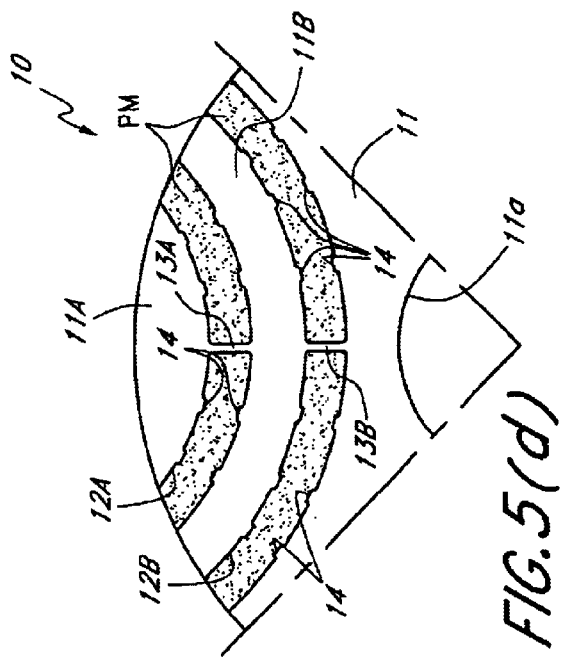

The arrangement of the embodiment shown in FIG. 5(b) is approximately the same as that of the embodiment of FIG. 5(a), except that recesses 15 are provided on the inside surfaces of the slits 12A, 12B in place of the projections 14. The recesses 15 are long grooves running axially of the rotor core 11 (in the direction perpendicular to the plane of FIG. 5(b). The recesses 15 are disposed in the inside surfaces of the slits 12A, 12B at appropriate intervals. In addition, each recess 15 has a trapezoidal cross-section whose width is larger toward the bottom. As a result, when the bond magnet is injection molded, it flows into the recesses 15, so that the inside surfaces of the slits 12A, 12B and the permanent magnets PM embedded therein are connected firmly. Thus, the same effect as in the embodiment of FIG. 5(a) can be achieved.

Figure 5C:
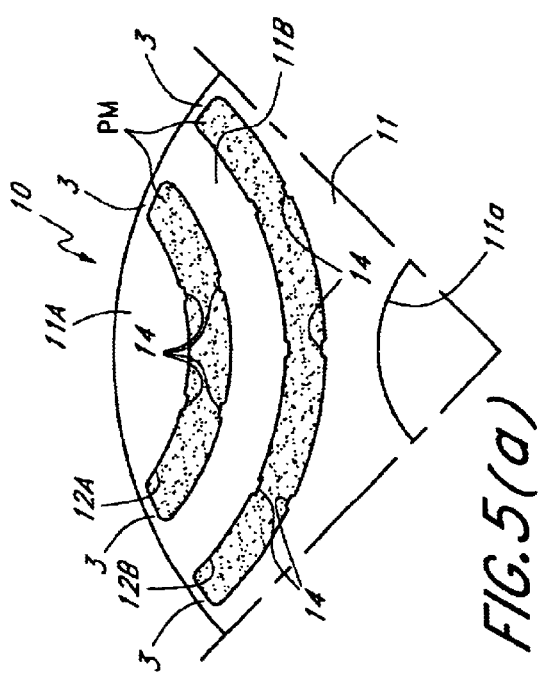

The arrangement of the embodiment of FIG. 5(c) is similar to that of FIG. 5(a), except that the number of the projections 14 is increased and the bridges 3 are eliminated. That is, the increased number of the projections 14 strengthens the connection of the permanent magnets PM to the inside surfaces of the slits 12A, 12B, which eliminates the bridges 3. In such an arrangement, no or little leakage flux is produced, thereby providing a more effective utilization of the permanent magnets PM.

Figure 5D:
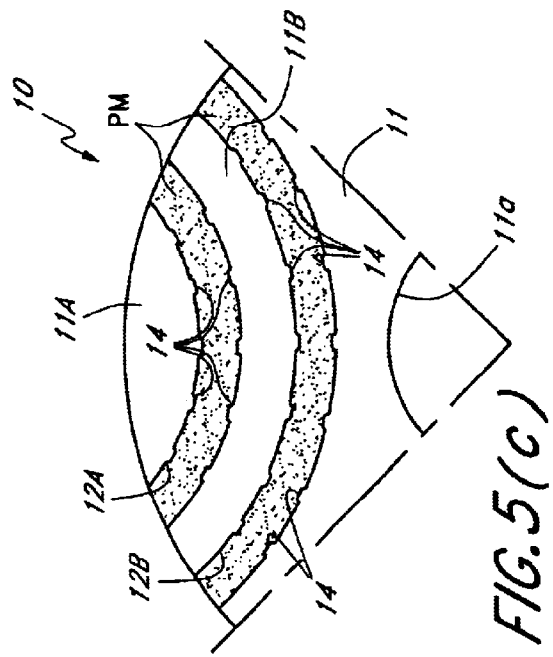

The arrangement of the embodiment of FIG. 5(d) is approximately the same as that of FIG. 5(c), except that bridges 13A, 13B are provided in the slits 12A, 12B at the longitudinal middle portions. In such an arrangement, the reluctance torque can be utilized effectively, while the resistance to the radial forces can be improved further.

Figure 6A:
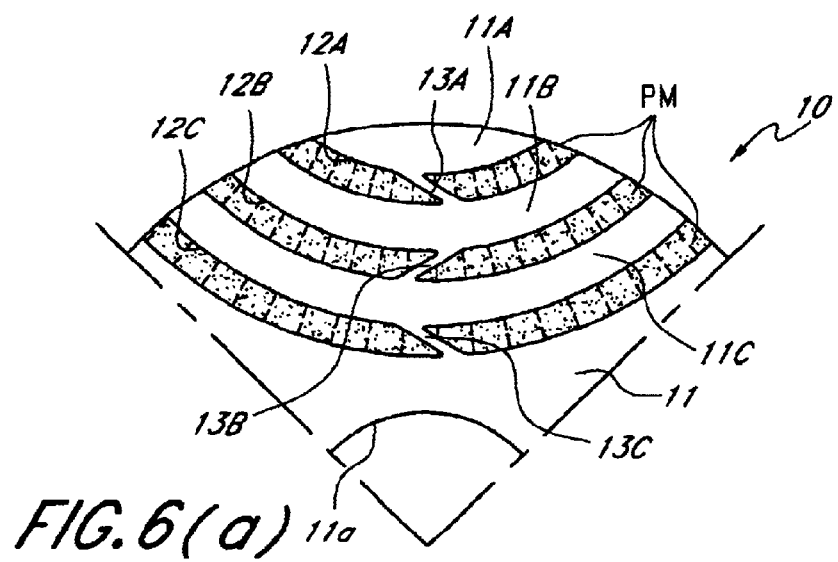
FIGS. 6(a), 6(b) and 6(c) are views showing configurations of a third embodiment of this invention.
Figure 6B:
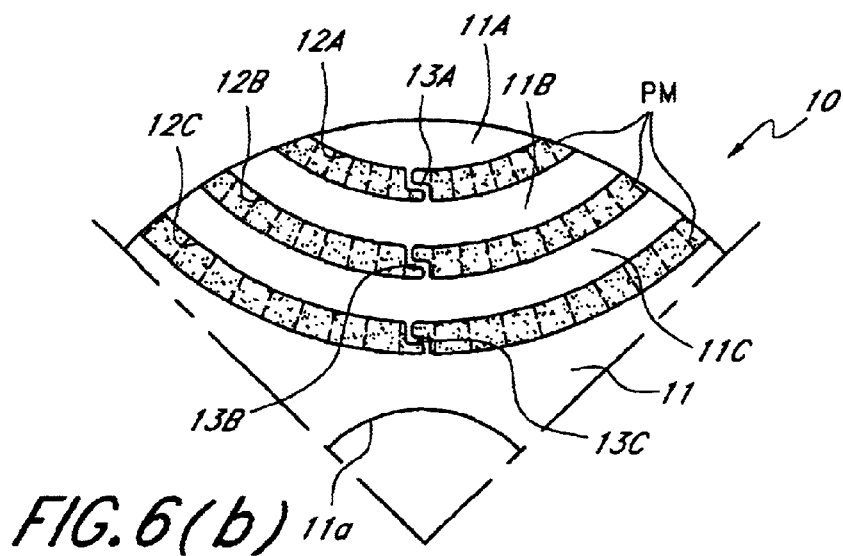
Figure 6C:
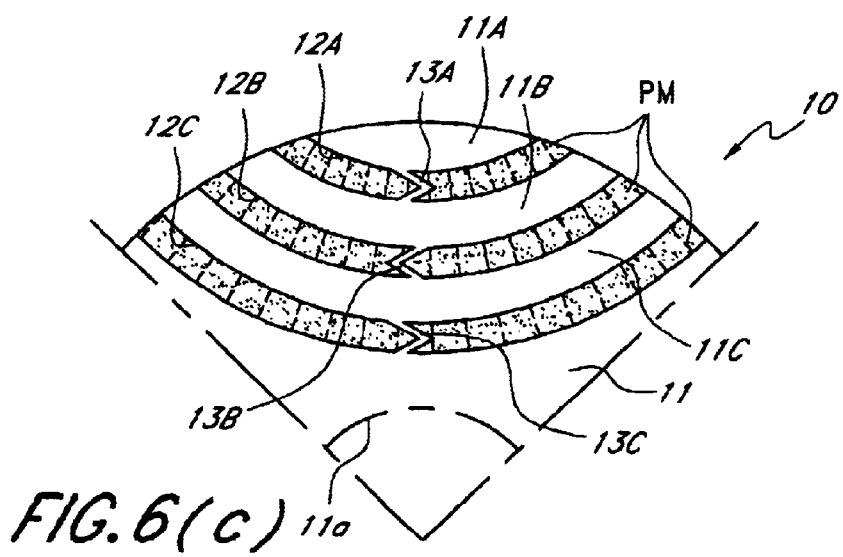

FIGS. 6(a), 6(b) and 6(c) are views that illustrate a third embodiment of the present invention. In FIGS. 6(a), 6(b) and 6(c), like parts and regions described above in connection with the first embodiment are designated by like symbols, and will not be described again in connection with FIGS. 6(a), 6(b) and 6(c).

In the third embodiment, the permanent magnet rotor 10 has approximately the same configuration as that of the first embodiment, except that bridges 13A, 13B, 13C are inclined with respect to the direction of magnetization of the permanent magnets.

In the embodiment of FIG. 6(a), the bridges 13A, 13B, 13C have a shape extending obliquely to the direction of thickness of the permanent magnets PM. Specifically, in the example of FIG. 6(a), the direction of inclination is different between the central bridge 13B and the bridges 13A, 13C on either side thereof; however, the central bridge 13B can also be inclined in the same direction as the bridges 13A and 13C. In the example of FIG. 6(b), the bridges 13A, 13B, 13C are in the shape of a crank. In the example of FIG. 6(c), the bridges 13A, 13B, 13C are in the shape of a letter C. Specifically, in the example of FIG. 6(c), the direction of the letter C is reversed between the central bridge 13B and the bridges 13A, 13C on either side thereof.

In the arrangement of FIGS. 6(a), 6(b) and 6(c), the bridges 13A, 13B, 13C have sections inclined with respect to the direction of magnetization. Accordingly, the bridges have large lengths so that the magnetic resistance is increased without need of decreasing the strength of the bridges 13A, 13B, 13C. This decreases the leakage flux and provides an effective utilization of the permanent magnets PM.

Although the slits 12A, 12B, 12C have the shape of an arc with the convex side of the arc directed toward the shaft hole 11a, the present invention is not limited to that shape. For example, the end shape may be a rectangle.

According to one aspect of the embodiments of the invention described above, bridges are formed at positions inwardly of the longitudinal ends of the slits toward the longitudinal middle portions, so that regions of high magnetic flux density due to the leakage flux can be decreased. An increase in the magnetic resistance in the magnetic paths of the q-axis magnetic flux $\Phi q$ in the rotor core is prevented and the reluctance torque can be utilized effectively.

According to another aspect of the embodiments of the invention described above, projections or recesses are provided on the inside surfaces of the slits to strengthen the connection of the solidified bond magnets to the inside surfaces of the slits. This causes the connections between the radially outer portions and the radially inner portions of the rotor core with respect to the respective slits to be strengthened through solidified bond magnets, and provides a sturdier rotor core capable of withstanding the large radial force due to the centrifugal force during high speed rotation.

Further, according to another aspect of the embodiments of the invention described above, bridges are inclined with respect to the direction of magnetization of the permanent magnets, so that the magnetic resistance in the bridges is increased without reducing the strength of the bridges. This decreases the leakage flux and improves the effective utilization of the magnets.

According to another aspect of the embodiments of the invention, the treatment of the rotor core is performed with the rotor core set at a fixed angular position using the openings of the slits in the circumferential surface of the rotor core. In accordance with this embodiment, an additional device for setting the angular position of the rotor core is not needed.

What is claimed is:

1. A permanent magnet rotor, comprising:
   a rotor core having a circumferential surface;
   a plurality of slits formed in the rotor core, each slit having a first end and a second end that extend to and are open to the circumferential surface of the core, each slit having a radially outward side and a radially inward side, each slit having a longitudinal middle portion between the first end and the second end at which a portion of the rotor core forms a bridge across the slit to interconnect a portion of the rotor core on the radially outward side of the slit with a portion of the rotor core on the radially inward portion of the slit; and
   a permanent magnet embedded in each slit.

2. The permanent magnet rotor of claim 1, wherein each permanent magnet comprises a bond magnet that fills the slit in a liquid form and is solidified.

3. The permanent magnet rotor of claim 2, wherein each slit has inside surfaces, and wherein the inside surfaces of each slit have projections or recesses formed thereon, which projections or slots are adapted to engage with the bond magnet when the bond magnet is solidified.

4. The permanent magnet motor of claim 3, wherein the bridges are inclined with respect to the direction of magnetization of the permanent magnets.

5. The permanent magnet motor of claim 2, wherein the bridges are inclined with respect to the direction of magnetization of the permanent magnets.

6. The permanent magnet motor of claim 1, wherein the bridges are inclined with respect to the direction of magnetization of the permanent magnets.

7. A permanent magnet rotor, comprising:
   a rotor core having a circumferential surface;
   a plurality of slits formed in the rotor core, each slit having a respective first end and a respective second end that extend to and are open to the circumferential surface of the rotor core, each slit having inner surfaces, each inner surface having projections or recesses formed thereon, each slit having a respective radially outward portion of the rotor core on one side of the slit and having a respective radially inward portion of the rotor core on an opposite side of the slit; and
   a permanent magnet embedded in each slit by filling each slit with bond magnet that solidifies, the bond magnet engaging the projections or recesses when solidified to interconnect the respective radially outward portion of the rotor core on the one side of the slit with the respective radially inward portion of the rotor core on the opposite side of the slit.

8. A permanent magnet rotor, comprising:
   a rotor core having a circumferential surface;
   a plurality of slits formed in the rotor core, each slit having a radially outward side and a radially inward side, each slit having a longitudinal middle portion at which a portion of the rotor core forms a bridge across the slit to interconnect a portion of the rotor core on the radially outward side of the slit with a portion of the rotor core on the radially inward portion of the slit, the bridge inclined with respect to a magnetization direction; and
   a permanent magnet embedded in each slit and magnetized in the magnetization direction.

* * * * *